United States Patent Office 3,280,047
Patented Oct. 18, 1966

3,280,047
TREATING CATION-EXCHANGE MEMBRANES FROM STYRENATED POLYETHYLENE WITH A SULFONATING REAGENT CONTAINING FORMALDEHYDE
Brian Alfred Cooke, Seamill, Scotland, assignor to Imperial Chemical Industries Limited, London, England, a corporation of Great Britain
No Drawing. Filed May 8, 1963, Ser. No. 279,002
Claims priority, application Great Britain, May 14, 1962, 18,402/62
6 Claims. (Cl. 260—2.2)

This invention relates to a process for the manufacture of cation-exchange membranes and ion-exchange membranes so produced.

Ion-exchange membranes are commonly prepared by treating thermoplastic polymeric materials containing a proportion of styrene in polymeric form with an ion-exchange group donor reagent. In one convenient process the thermoplastic material is prepared by absorbing monomeric styrene together with a small proportion of a polymerization catalyst into a carrier polymer such as polyethylene and causing the styrene to be polymerised in situ within the polymer. The carrier polymer may be in sheet or granular form but, if granular, the resulting thermoplastic granules are sheeted at this stage before treatment with the aforesaid reagent. Cation-exchange materials are usually prepared by treating the polymeric sheet with sulphonating agents such as, for example, chlorosulphonic acid, mixtures of chlorosulphonic acid and sulphuryl chloride or ether complexes of sulphur trioxide.

Cation-exchange membranes thus prepared are, however, rather unsatisfactory in certain important respects. Their stability to hot solutions is poor, their tensile modulus (at 1 percent deformation) is rather low and their selectivity is often undesirably low. Because of their low tensile modulus cation-exchange membranes often become excessively deformed when used in electrodialysis apparatus and this deformation can result in poor flow distribution in the apparatus.

It is an object of the present invention to provide an improved process for the manufacture of cation-exchange membranes from styrene containing thermoplastic polymeric material of the aforesaid kind.

In accordance with the present invention cation-exchange membranes are prepared by treating sheeted thermoplastic polymeric material containing a proportion of styrene in polymeric form with a reagent containing a cation-exchange group donor reagent and formaldehyde, the concentration of formaldehyde being in the range 0.01 to 5 percent by weight of total reagent. Higher formaldehyde concentrations give membranes which are rather brittle. It is preferred to use formaldehyde concentrations of 0.25 to 1.5 percent by weight of the reagent.

The cation-exchange group donor reagents are preferably the usual sulphonating agents.

The thermoplastic polymeric material conveniently consists of polymeric styrene and a carrier polymer of polyethylene or polypropylene. This material preferably contains between 10 and 35 percent by weight of polymeric styrene.

Using the process of the invention improved cation-exchange membranes may be prepared, which membranes have properties which render them more satisfactory for use in electrodialysis than membranes hitherto prepared from the identical polymeric material using the corresponding ion-exchange group donor reagent. We believe that the improved properties result from an enhanced degree of crosslinking in the membrane which is effected by the action of the formaldehyde.

The invention is further illustrated by the following examples in which all parts are by weight.

EXAMPLE 1

70 parts of powdered polyethylene of density 0.95–0.96 g./cc. were caused to imbibe 30 parts of styrene containing 0.3 parts benzoyl peroxide by agitating the mixture of styrene and polyethylene at 70° C. until the styrene was fully absorbed in the polyethylene. The styrene was subsequently polymerised within the polyethylene by heating at 90° C. for 16 hours and the resultant polymeric material was calendered into a sheet having a thickness of 0.25 millimetres.

A first sample of this polymeric sheet was immersed for 16 hours at room temperature in a sulphonating agent consisting of 90 parts sulphuryl chloride and 10 parts chlorosulphonic acid. The cation-exchange membrane was thereafter immersed in 10% sodium hydroxide solution at 45° C. for 1½ hours to hydrolyse the sulphonyl chloride groups and washed with water. The salt diffusion flux, current efficiency, resistance and tensile modulus of the wet freshly prepared membranes and of the membranes after immersion in water at 80° C. for 100 hours were determined and the results obtained are set forth in Table 1 under Sample 1.

*Table 1*

|  | Sample 1 | | Sample 2 | |
| --- | --- | --- | --- | --- |
|  | Fresh | After 100 hours in water at 80° C. | Fresh | After 100 hours in water at 80° C. |
| Salt diffusion flux | 0.68 | 2.1 | 0.05 | 0.08 |
| Current efficiency | 0.85 | 0.80 | 0.923 | 0.922 |
| Resistance (ohms) | 4.1 | 4.0 | 13 | 9 |
| Tensile modulus (kg. cm.$^{-2}$) | 1,300 |  | 2,100 |  |

A second sample of the polymeric sheet was converted into a cation-exchange membrane by the process of the present invention by immersing it for 16 hours in a solution containing 90 parts sulphuryl chloride, 10 parts chlorosulphonic acid and 0.35 part formaldehyde at room temperature. The subsequent treatment and testing of the membrane was the same as for the first sample and the results are also included in Table 1 under Sample 2.

In the tests the salt diffusion flux was determined as the sodium chloride flux occurring when the membrane separated a 1.5 percent solution of sodium chloride from distilled water at 25° C.

The "current efficiency" was determined by the test which is described in the Discussions of the Faraday Society 1956, No. 21, pages 185–192. The membranes were incorporated in the following electrolysis train,

| Platinum Anode | 1.0 N NaCl | A | Suspension of finely powdered chloride of anion-exchange resin | A | 0.1 N NaCl | Test membrane | 1.0 N NaCl | C | 1.0 N NaCl | Platinum Cathode | where A and C denote reasonably selective anion and cation exchange membranes respectively. The "current efficiency" was calculated and is recorded as the number of equivalents of sodium chloride removed from the central compartment (0.1 N NaCl) per faraday of current passed.

The resistance is given as the resistance in ohms of a square centimetre equilibrated with 0.1 N sodium chloride solution at 25° C. and the value of the tensile modulus given is that at one per cent deformation of the wet membranes.

The results show that both membranes had satisfactory electrical resistance, a value below 20 ohm.cm$^2$ being considered satisfactory. Sample 2 (in accordance with the invention) was, however, markedly superior in respect fo salt diffusion flux, current efficiency and tensile properties and its salt diffusion flux was less affected by the hot water treatment than that of Sample 1.

EXAMPLE 2

25 parts of styrene containing 0.25 part benzoyl peroxide were absorbed and polymerised in situ in 75 parts of powdered polypropylene in the manner described for absorption and polymerisation of styrene into polyethylene in Example 1. A sheet of thickness 0.25 millimetre was formed from this polymer by compression moulding.

A first sample of this polymeric sheet was immersed for 65 hours at room temperature in a sulphonating agent consisting of 3.7 parts of the equimolar complex of sulphur trioxide and 1:4-dioxane dissolved in 96.3 parts of methylene chloride. The resulting ion-exchange membrane was then converted to its sodium form by treatment with 10 per cent sodium hydroxide at room temperature. The current efficiency of the freshly prepared membrane determined by the test described in Example 1 was found to be 0.790. After treatment for 100 hours in water at 80° C. the membrane disintegrated, so that its electrochemical properties could not be measured.

It was ascertained, however, that the cation-exchange capacity of the sodium form of the membrane had dropped from 1.55 to 0.41 milliequivalent per gram of dry membrane as a result of the hot water treatment.

A second sample of the polymeric sheet was converted into a cation-exchange membrane in accordance with the invention by immersing it for 65 hours at room temperature in a solution containing 100 parts of the same sulphonating agent used in treating the first sample together with 0.02 part of formaldehyde. The resulting membrane had a current efficiency of 0.929 and was not noticeably affected in respect of its mechanical properties or cation-exchange capacity when immersed for 100 hours in water at 80° C.

What I claim is:

1. In a process for the preparation of cation-exchange membranes from sheeted thermoplastic polymeric material containing a proportion of styrene in polymeric form, the improvement which comprises treating said sheet with a sulphonating reagent containing formaldehyde, the concentration of formaldehyde being in the range 0.01–5 percent by weight of the total reagent.

2. A process in accordance with claim 1 in which the formaldehyde concentration is within the range 0.25–1.5 percent by weight of the reagent.

3. A process in accordance with claim 1 in which the thermoplastic polymeric material consists of polymeric styrene and a carrier polymer of polyethlyene or polypropylene.

4. A process in accordance with claim 1 in which the thermoplastic polymeric material contains between 10 and 35 percent by weight of polymeric styrene.

5. A process for the manufacture of cation-exchange membranes which comprises causing a carrier polymer of polyethylene or polypropylene in comminuted form to imbibe a predetermined quantity of monomeric styrene until the styrene is fully absorbed, subsequently heating the mixture to polymerise the styrene, forming the resulting polymer into a sheet and treating the sheet with a sulfonating reagent containing formaldehyde, said formaldehyde having a concentration of 0.01 to 5% by weight of the total reagent.

6. Ion-exchange membranes prepared by the process in accordance with claim 5.

References Cited by the Examiner
UNITED STATES PATENTS

| | | | |
|---|---|---|---|
| 2,953,547 | 9/1960 | Patterson | 260—2.2 |
| 3,133,889 | 5/1964 | Hazenberg | 260—2.2 |

WILLIAM H. SHORT, *Primary Examiner.*

J. C. MARTIN, *Assistant Examiner.*